(12) United States Patent
Swier et al.

(10) Patent No.: US 11,639,058 B2
(45) Date of Patent: May 2, 2023

(54) SUPPLY CONTAINERS WITH ALIGNMENT COMPONENTS

(71) Applicant: HEWLETT-PACKARD DEVELOPMENT COMPANY, L.P., Spring, TX (US)

(72) Inventors: Kevin E. Swier, Corvallis, OR (US); David C. Harvey, Corvallis, OR (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 101 days.

(21) Appl. No.: 16/609,481

(22) PCT Filed: Oct. 5, 2017

(86) PCT No.: PCT/US2017/055253
§ 371 (c)(1),
(2) Date: Oct. 30, 2019

(87) PCT Pub. No.: WO2019/070262
PCT Pub. Date: Apr. 11, 2019

(65) Prior Publication Data
US 2020/0223211 A1 Jul. 16, 2020

(51) Int. Cl.
| | | |
|---|---|---|
| *B41J 2/175* | (2006.01) |
| *B33Y 10/00* | (2015.01) |
| *B33Y 30/00* | (2015.01) |
| *B33Y 40/00* | (2020.01) |
| *B33Y 50/02* | (2015.01) |
| *B29C 64/329* | (2017.01) |
| *B29C 64/393* | (2017.01) |
| *B29C 64/165* | (2017.01) |
| *B22F 10/30* | (2021.01) |

(52) U.S. Cl.
CPC .......... *B41J 2/17513* (2013.01); *B33Y 10/00* (2014.12); *B33Y 30/00* (2014.12); *B33Y 40/00* (2014.12); *B22F 10/30* (2021.01); *B29C 64/165* (2017.08); *B29C 64/329* (2017.08); *B29C 64/393* (2017.08); *B33Y 50/02* (2014.12)

(58) Field of Classification Search
CPC ......... B33Y 10/00; B33Y 30/00; B33Y 40/00; B33Y 50/02; B22F 10/30; B22F 12/22; B22F 12/226; B22F 12/90; B22F 12/38; B29C 64/165; B29C 64/329; B29C 64/393; B29C 64/259; Y02P 10/25; B41J 2/1752; B41J 2/17523; B41J 2/17546; B41J 2/1755; B41J 2/17553; B41J 29/38; B41J 2/17513
See application file for complete search history.

(56) References Cited

U.S. PATENT DOCUMENTS

| | | |
|---|---|---|
| 6,145,968 A | 11/2000 | Fries et al. |
| 6,851,799 B2 | 2/2005 | Trafton et al. |
| (Continued) | | |

FOREIGN PATENT DOCUMENTS

| | | |
|---|---|---|
| CN | 1954269 | 4/2007 |
| CN | 203063287 | 7/2013 |
| (Continued) | | |

*Primary Examiner* — S. Behrooz Ghorishi
(74) *Attorney, Agent, or Firm* — Shook, Hardy & Bacon L.L.P.

(57) ABSTRACT

A supply container includes a housing and a pocket on to the housing to receive a chip. The supply container also includes an alignment component on the housing to align the pocket with a chip access device.

4 Claims, 7 Drawing Sheets

(56) References Cited

U.S. PATENT DOCUMENTS

| | | |
|---|---|---|
| 7,874,660 B2 | 1/2011 | Haines et al. |
| 9,154,649 B2 | 10/2015 | Fujimori et al. |
| 9,174,389 B2 | 11/2015 | Swanson |
| 2009/0096836 A1 | 4/2009 | Haines et al. |
| 2010/0208016 A1 | 8/2010 | Menchik et al. |
| 2011/0128330 A1 | 6/2011 | Chen et al. |
| 2014/0320906 A1 | 10/2014 | Fujimori et al. |
| 2017/0087770 A1 | 3/2017 | Herzog |

FOREIGN PATENT DOCUMENTS

| | | |
|---|---|---|
| CN | 106476270 A | 3/2017 |
| WO | WO2016097911 A1 | 6/2016 |
| WO | WO-2017014779 A1 | 1/2017 |

SUPPLY CONTAINERS WITH ALIGNMENT COMPONENTS

BACKGROUND

Printing technologies may be used to create three-dimensional (3D) objects from data output from, for example, a computerized modeling source. For example, a 3D object may be designed using a computer program (e.g., a computer aided design (CAD) application) to generate a 3D model of the object, and the computer may output the data of the 3D model to a printing system capable of forming the solid 3D object. Solid free-form fabrication (or layer manufacturing) may be defined generally as a fabrication technology used to build a 3D object using layer by layer or point-by-point fabrication. With this fabrication process, complex shapes may be formed without the use of a pre-shaped die or mold.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Three-dimensional (3D) printing systems use build material to create 3D objects. Two-dimensional (2D) printing systems and other types of systems may also use print material for forming text and/or images. The build material and/or other print material supplies should be compatible with the printing systems in which they are used to ensure proper and safe operation of the printing systems.

Accordingly, disclosed herein is a supply container for a printing system, such as a 3D printing system. The supply container includes a housing, a chip, and a first alignment component to align a chip access device with the chip. The supply container may also include a second alignment component to align the chip access device with the chip. A printing system in which the supply container may be used may include a chip access device moveable between a first position where the chip access device is disengaged from an interface of the chip and a second position where the chip access device is engaged with the interface of the chip. As the chip access device is moved from the first position to the second position, the chip access device engages the first alignment component and the second alignment component to align a data connector of the chip access device with the interface of the chip.

The supply container chip may store data regarding the type of build material or print material contained within the supply container, the amount of material remaining in the supply container, and/or any other suitable information regarding the supply container and/or the material contained within the supply container. With the chip access device engaged with the interface of a supply container chip, the chip may be accessed by the printing system for read and/or write access. With the chip access device disengaged from the interface of the supply container chip, the supply container may be removed, replaced, or rotated. In this way, the supply container chip may be used to ensure compatibility of the material contained within the supply container with the printing system, to track the amount of material remaining within the container, and/or to perform and/or track other suitable functions of the printing system.

Figure 1:
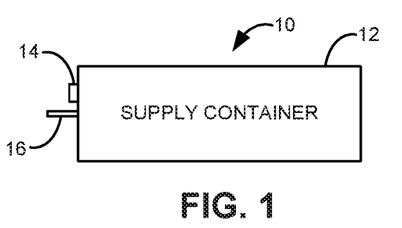
FIG. 1 is a schematic diagram illustrating one example of a supply container for a printing system.

FIG. 1 is a schematic diagram illustrating one example of a supply container 10 for a printing system. In one example, supply container 10 is used to supply a build material to a 3D printing system. Supply container 10 includes a housing 12, a chip 14 or another electronic device (e.g., processor, etc.), and an alignment component 16. Chip 14 may include a memory storing information about supply container 10 and the material contained within supply container 10. For example, chip 14 may store a code that identifies the material and the amount of material remaining within supply container 10.

Alignment component 16 is used to align chip 14 with a chip access device when chip 14 is accessed for read or write access by a printing system. The chip 14 and the alignment component 16 are coupled to housing 12. In this example, chip 14 and alignment component 16 are coupled to one end of housing 12 adjacent to each other. Alignment component 16 is orthogonal to chip 14 such that alignment component 16 is engaged by a chip access device prior to the chip access device engaging chip 14. Therefore, the chip access device is aligned with the interface of chip 14 prior to the chip access device contacting the chip.

Figure 2:
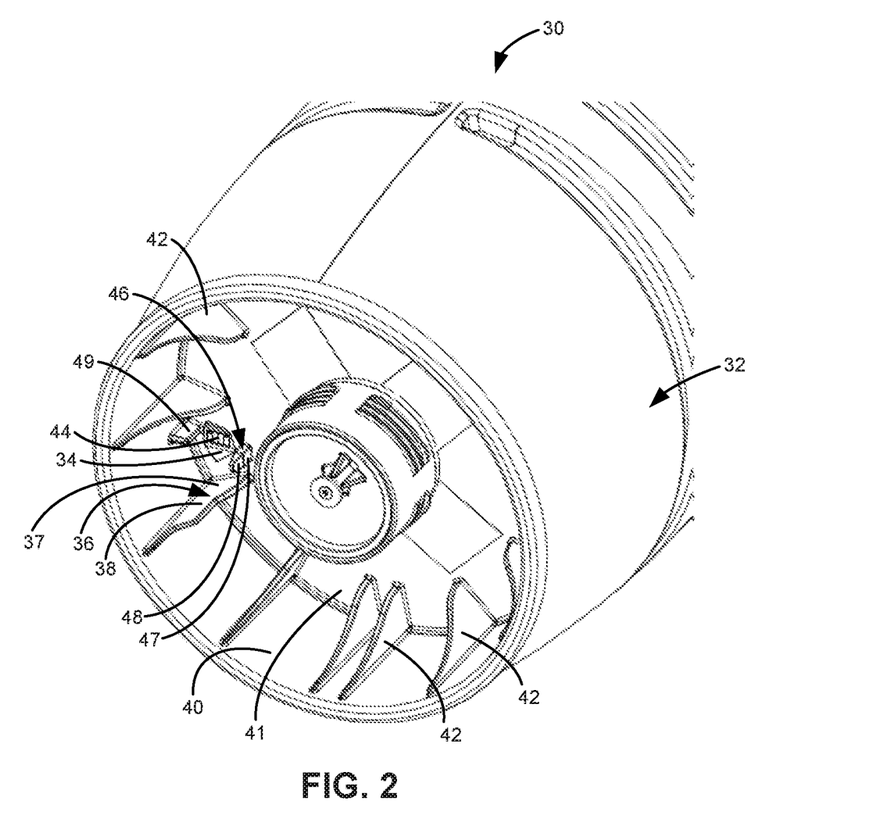
FIG. 2 illustrates one example of one end of a supply container.

FIG. 2 illustrates one example of one end of a supply container 30. Supply container 30 includes a housing 32 and a pocket 34 on housing 32 to receive a chip 44. Supply container 30 also includes a first alignment component 36 and a second alignment component 46, 49 on housing 32 to align the pocket 34 and thus chip 44 with a chip access device. First alignment component 36 is configured to engage with a first alignment component of a chip access device. In this example, first alignment component 36 includes a fin. Fin 36 may include a first portion 37 having a first width and a second portion 38 have a second width less than the first width. The second portion 38 of the fin may be rectangular shaped. In other examples, first alignment component 36 may have another suitable configuration.

Second alignment component 46, 49 is configured to engage with a second alignment component of a chip access device. In this example, the second alignment component includes a tab 46 and a fin 49. Tab 46 may include a base portion 47 and a tapered portion 48 extending from the base portion 47. Fin 49 may be rectangular shaped. In this example, fin 49 is smaller than fin 36. Fin 49 is arranged on a first side of pocket 34 and tab 46 is arranged on a second side of pocket 34 opposite to the first side. In other examples, second alignment component 46, 49 may have another suitable configuration. In one example, first alignment component 36 is used to coarsely align a chip access device with chip 44 and second alignment component 46, 49 is used to finely align a chip access device with chip 44 to ensure a data connection between chip 44 and a chip access device.

Housing 32 includes a cylindrical sidewall portion 40 and an inner sidewall portion 41 extending between the cylindrical sidewall portion 40. Pocket 34 is coupled to the inner sidewall portion 41. Pocket 34 may extend from inner sidewall portion 41 or may be a recess within inner sidewall portion 41. Chip 44 is attached to pocket 34 via glue, a press fit connection, and/or in another suitable manner. First alignment component 36 is coupled to the cylindrical sidewall portion 40 and the inner sidewall portion 41 such that first alignment component 36 is orthogonal to pocket 34 and chip 44. Tab 46 of the second alignment component is coupled to the inner sidewall portion 41 such that tab 46 is orthogonal to pocket 34 and chip 44. In this example, tab 46 is also parallel to the contacts of chip 44 and radially inward of the pocket 34. Fin 49 of the second alignment component is coupled to the cylindrical sidewall portion 40 and the inner sidewall portion 41 such that fin 49 is orthogonal to pocket 34 and chip 44. Supply container 30 may also include a plurality of fins 42 coupled to the cylindrical sidewall portion 40 and the inner sidewall portion 41. In one example, housing 32, pocket 34, first alignment component 36, and second alignment component 46, 49 are a single integral part (e.g., an injection molded part, a 3D printed part, etc.).

Figure 3A:
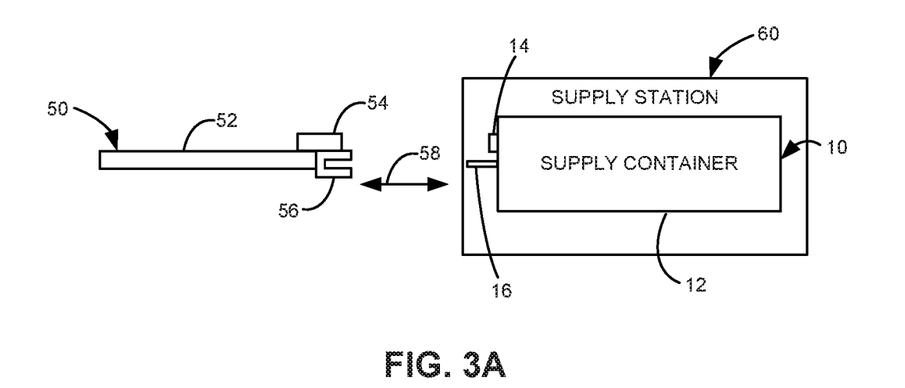
FIGS. 3A-3B are schematic diagrams illustrating one example of a chip access device of a printing system.
Figure 3B:
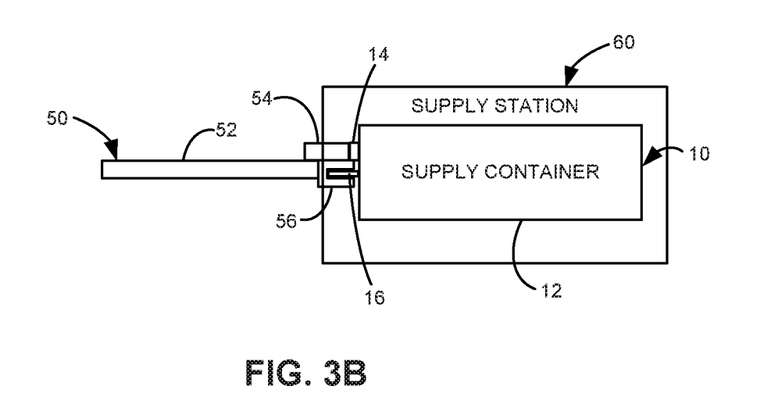

FIGS. 3A-3B are schematic diagrams illustrating one example of a chip access device 50 of a printing system including a supply station 60. Supply station 60 is to receive a supply container 10. Supply container 10 includes a housing 12, a chip 14, and an alignment component 16 as previously described and illustrated with reference to FIG. 1. Supply container 10 may be removably installed in supply station 60 such that an empty supply container 10 may be removed from supply station 60 and replaced with a full supply container 10. Supply station 60 may be a rotatable supply station that may be rotated with a supply container 10 installed within the supply station. In one example, supply station 60 may be rotated in a first direction to remove material from supply container 10 and rotated in a second direction opposite to the first direction to add material to supply container 10.

Chip access device 50 includes a rail 52, a data connector 54, and an alignment component 56. Data connector 54 and alignment component 56 are coupled to rail 52. The rail 52 and thus data connector 54 and alignment component 56 is moveable, as indicated at 58, between a first position as illustrated in FIG. 3A and a second position as illustrated in FIG. 3B. In one example, the rail 52 and thus data connector 54 and alignment component 56 is moveable in a direction parallel to a long axis of the supply container 10. In the first position as illustrated in FIG. 3A, alignment component 56 is disengaged from alignment component 16 and data connector 54 is disengaged from the interface of supply container chip 14. In the first position, a supply container 10 may be removed from and/or installed in supply station 60.

In the second position as illustrated in FIG. 3B, alignment component 56 is engaged with alignment component 16 and the data connector 54 is engaged with the interface of supply container chip 14. Alignment component 56 engages alignment component 16 prior to data connector 54 contacting the interface of chip 14 such that data connector 54 is aligned with the interface of chip 14 prior to contacting the interface of chip 14. In one example, data connector 54 is moved to the second position as illustrated in FIG. 3B when the supply station 60 is stationary and moved to the first position as illustrated in FIG. 3A prior to the supply station 60 being rotated. With the data connector in the second position as illustrated in FIG. 3B, chip 14 may be accessed for read or write operations. Data connector 54 and chip 14 may include analog or digital electrical interfaces, optical interfaces, and/or other suitable interfaces for providing a data connection between data connector 54 and chip 14.

Figure 4:
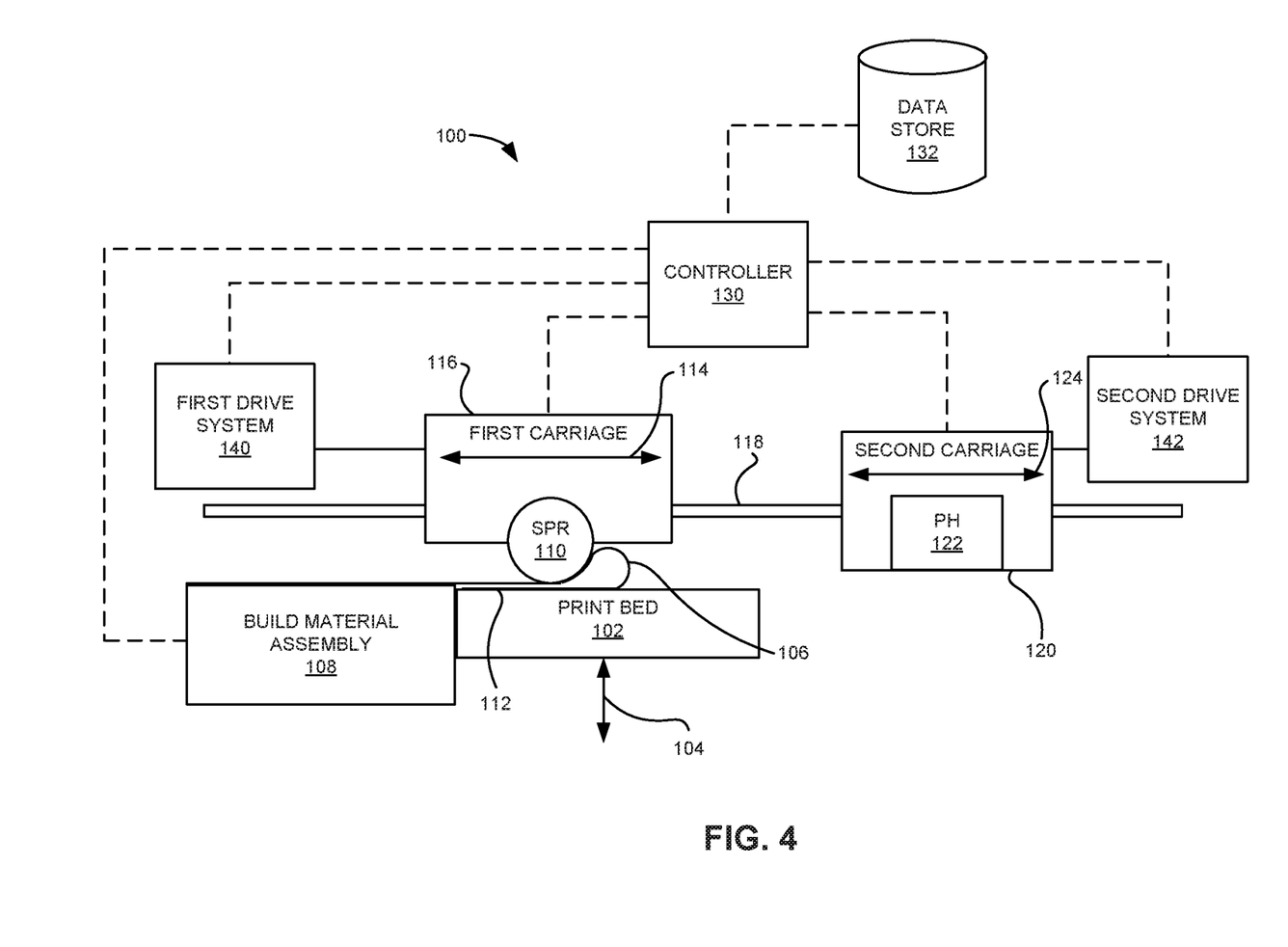
FIG. 4 is a block diagram illustrating one example of a three-dimensional (3D) printing system.

FIG. 4 is a block diagram illustrating one example of a 3D printing system 100. 3D printing system 100 includes a print bed 102, a build material assembly 108, a spreader 110, a first carriage 116, a rail 118, a second carriage 120, a printhead 122, a controller 130, a data store 132, a first drive system 140, and a second drive system 142. In other examples, 3D printing system 100 may include additional components and some of the components described herein may be removed and/or modified.

Print bed 102 may be positioned on a platform (not shown) that moves in a vertical direction to thus cause the print bed 102 to move in a vertical direction as indicated by arrow 104. 3D objects or parts are generated from a build material 106 within a build envelope, which may be defined as the three-dimensional space on the top of print bed 102. Build material 106 is supplied by build material assembly 108. In one example, build material assembly 108 includes chip access device 50 and supply station 60 previously described and illustrated with reference to FIGS. 3A-3B.

Build material 106 may be applied or spread as desired onto print bed 102 by spreader 110 to form a build material layer 112. For example, build material 106 may be provided at build material assembly 108 at a slightly higher elevation as compared to the height of the surface of print bed 102 and spreader 110 may move in a horizontal direction from a location above build material assembly 108 to a location across print bed 102 from build material assembly 108, as indicated by the arrow 114. Build material assembly 108 may include a rotatable supply station 60 (FIGS. 3A-3B) to provide the build material layer 112 from a supply container 10 to a position to be spread onto print bed 102 or a previously formed build material layer.

In one example, build material 106 is a powder-based build material. As used herein, the term powder-based build material is intended to encompass dry powder-based materials, wet powder-based materials, particulate materials, granular materials, etc. Build material 106 may be formed from, or may include, short fibers that may, for example, have been cut into short lengths from long strands or threads of material. Build material 106 may include plastics, ceramics, and/or metals. In other examples, build material 106 may be used with other suitable build materials, with suitable modification if appropriate. In still other examples, the build material 106 may be any other suitable form of build material.

Spreader (SPR) 110 may be positioned above print bed 102 such that a relatively small gap exists between spreader 110 and print bed 102. As such, as spreader 110 pushes build material 106 across the surface of print bed 102, a layer of build material 112 may be formed on print bed 102. A similar operation may be performed to form additional build material layers above print bed 102. Spreader 110 may be mounted on first carriage 116, which is movable across print bed 102. First carriage 116 may be movably supported on rail 118 and may be moved along rail 118 such that spreader 110 may be moved from a location above the build material assembly 108 to an opposite end of print bed 102.

Printhead (PH) 122 is mounted to second carriage 120. Although second carriage 120 illustrated in FIG. 2 includes a single printhead 122, in other examples second carriage 120 may support any suitable number of printheads. Second carriage 120 may be movably supported on rail 118 and may be moved along rail 118. Printhead 122 may include a plurality of nozzles (not shown) through which a printing liquid, such as a fusing agent, a chemical binder, an ink, a cooling agent, or the like, is ejected. Printhead 122 may be, for instance, a thermal inkjet printhead, a piezoelectric printhead, etc., and may extend a width of the print bed 102. Second carriage 120 may be moved across print bed 102 in the horizontal direction as indicated by the arrow 124 to enable printhead 122 to deposit liquid onto desired locations of build material layer 112 through the nozzles. In one example, printhead 122 may be controlled to deposit the liquid at the locations on build material layer 112 that are to be fused together or otherwise solidified. When an energy absorbing fusing agent is used, 3D printing system 100 may further include an energy source (not shown) to apply energy (e.g., heat) onto build material layer 112 to cause the sections of build material 106 upon which the fusing agent has been deposited to be fused together.

Controller 130 may be a computing device, a semiconductor-based microprocessor, an application specific integrated circuit (ASIC), and/or other hardware device, to control the operation of the components of 3D printing system 100. The communication lines between controller 130 and other components of 3D printing system 100 are depicted as dashed lines. Controller 130 may independently control first drive system 140 and second drive system 142 to independently control the movement and/or the speeds of movement of first carriage 116 and second carriage 120, respectively.

Controller 130 is also in communication with data store 132. Data store 132 may include data pertaining to a 3D part to be printed by 3D printing system 100. For example, the data may include the locations in each build material layer 112 that printhead 122 is to deposit printing agent or liquid to form the 3D part. In one example, controller 130 may use the data to control the locations on each of the build material layers 112 that the printhead 122 deposits liquid. Controller 130 may also control the supply of build material 106 by build material assembly 108, the movement of print bed 102, and the movement of spreader 110. In addition, controller 130 may read and/or write data to and from the chip 14 (FIGS. 3A-3B) of a supply container 10.

Figure 5A:
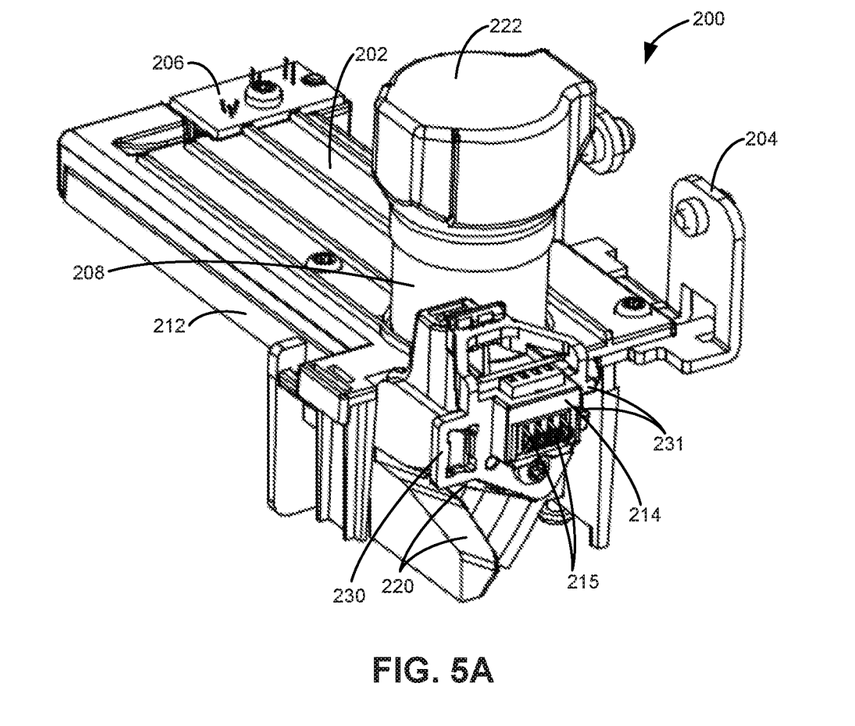
FIGS. 5A-5C illustrate another example of a chip access device of a printing system.
Figure 5B:
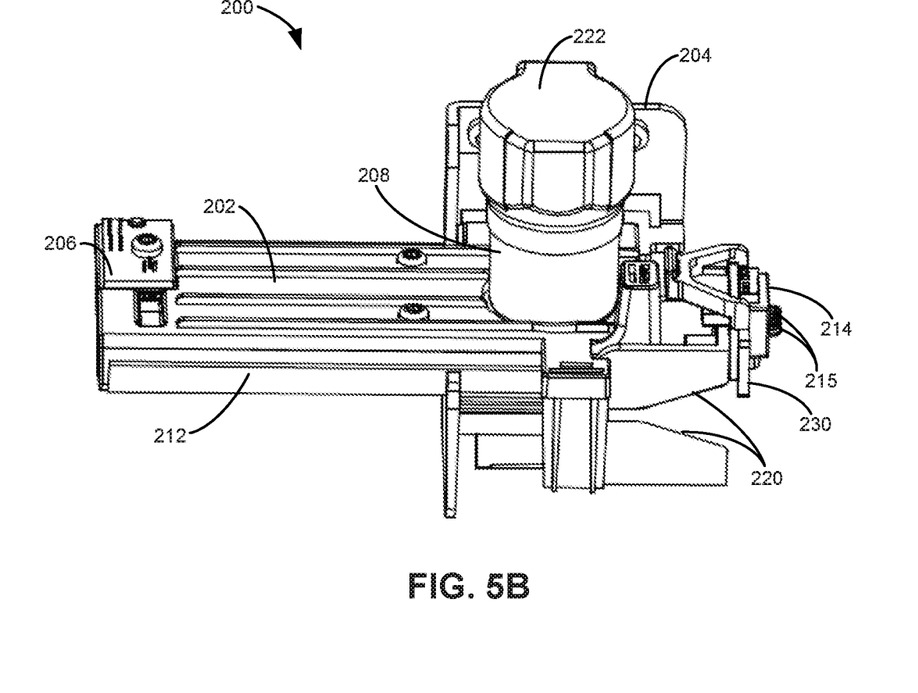
Figure 5C:
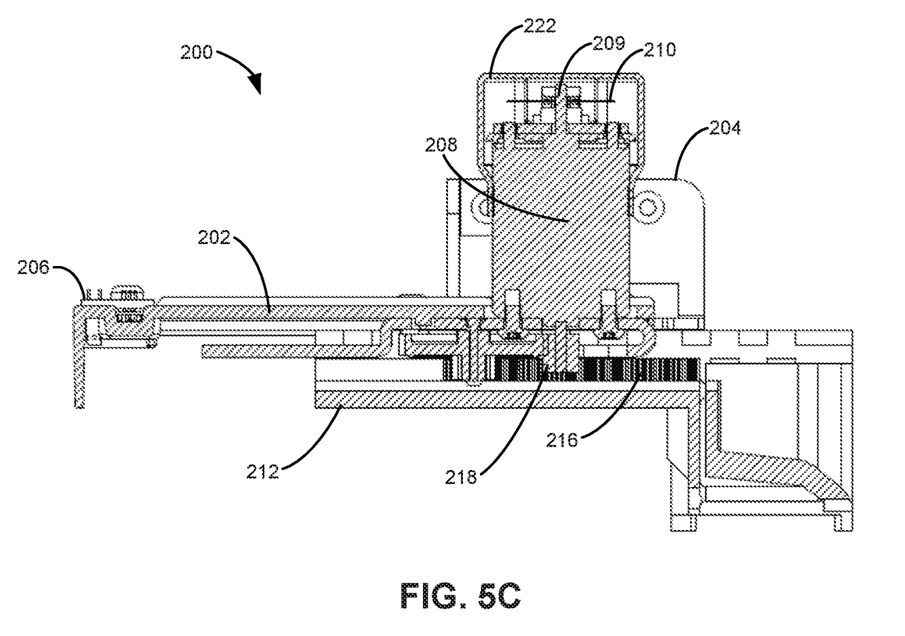

FIG. 5A illustrates a perspective view, FIG. 5B illustrates a side view, and FIG. 5C illustrates an internal view of another example of a chip access device 200 of a printing system. Chip access device 200 may be part of build material assembly 108 of printing system 100 previously described and illustrated with reference to FIG. 4. In this example, chip access device 200 includes a rail mount 202, a mounting bracket 204, a sensor 206, a motor 208, an encoder 210, a rail 212, a data connector 214, a rack 216 and pinion 218, a first alignment component 220, a second alignment component 230, 231, and a dust cover 222. In other examples, chip access device 200 may include additional components and some of the components described herein may be removed and/or modified.

Rail mount 202 is coupled to mounting bracket 204. Mounting bracket 204 may be attached to a fixed portion of build material assembly 108 (FIG. 4). Sensor 206 is coupled to one end of rail mount 202. Sensor 206 may be an optical sensor or another suitable sensor for sensing rail 212. Sensor 206 may be electrically coupled to controller 130 (FIG. 4) to pass sensor data to controller 130.

Motor 208 includes a housing coupled to mounting bracket 204. Motor 208 may be a direct current (DC) motor (e.g., pulse motor) or another suitable motor. Motor 208 includes a motor shaft 209 (FIG. 5C) orthogonal to rail mount 202 and rail 212. Encoder 210 (FIG. 5C) is attached to motor shaft 209 at the back of motor 208 facing away from rail mount 202 and pinion 218 is attached to motor shaft 209 at the front of motor 208 facing rail mount 202. Dust cover 222 covers encoder 210 and the back of motor 208. Motor 208 and encoder 210 may be electrically coupled to controller 130 (FIG. 4). Controller 130 may receive encoder data from encoder 210 and control the rotation of motor 208. Accordingly, controller 130 may control the position of rail 212 by rotating motor 208 based on feedback from encoder 210.

Rail 212 is movably coupled to rail mount 202. Rack 216 (FIG. 5C) is coupled to rail 212 and engages pinion 218 such that rail 212 moves laterally along rail mount 202 in response to rotation of motor shaft 209 of motor 208. Data connector 214 is coupled to one end of rail 212. In this example, data connector 214 is an electrical connector including spring contacts 215 for contacting contacts of a chip of a supply container. In other examples, data connector 214 may be an optical connector or another suitable connector for interfacing with a chip of a supply container. In this example, data connector 214 includes four spring contacts 215. In other examples, data connector 214 may include any suitable number of contacts. Data connector 214 may be electrically coupled to controller 130 (FIG. 4). Controller 130 may access a chip of a supply container for read and/or write operations through data connector 214.

First alignment component 220 is coupled to rail 212 below data connector 214. First alignment component 220 is configured to engage a first alignment component of a supply container. In this example, first alignment component 220 includes a V-shaped notch. In other examples, first alignment component 220 may have another suitable configuration. The second alignment component includes a first portion 230 coupled to rail 212 adjacent to a first side of data connector 214 and a second portion 231 coupled to rail 212 adjacent to a second side of data connector 212 opposite to the first side. Second alignment component 230 is configured to engage a second alignment component of a supply container. In this example, first portion 230 of the second alignment component includes a rectangular shaped through-hole parallel to the contacts 215 of data connector 214 and second portion 231 includes a notch. In other examples, second alignment component 230, 231 may have another suitable configuration.

Figure 6A:
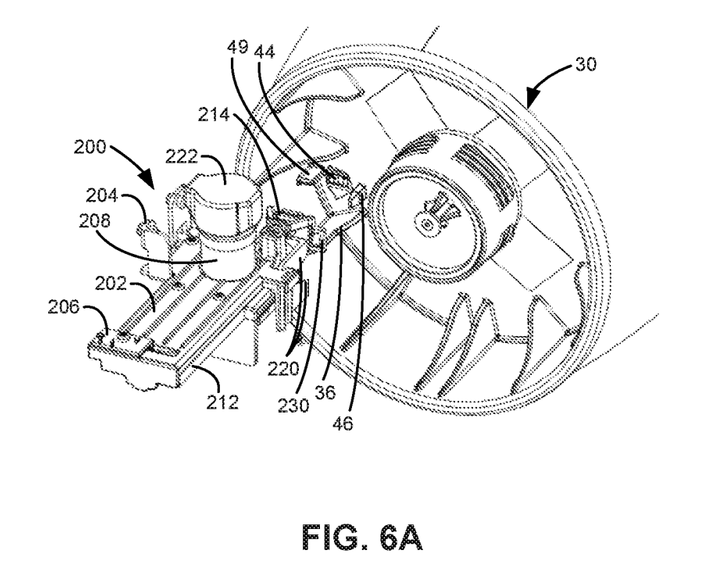
FIG. 6A-6B illustrate one example of the operation of the chip access device of FIGS. 5A-5C.
Figure 6B:
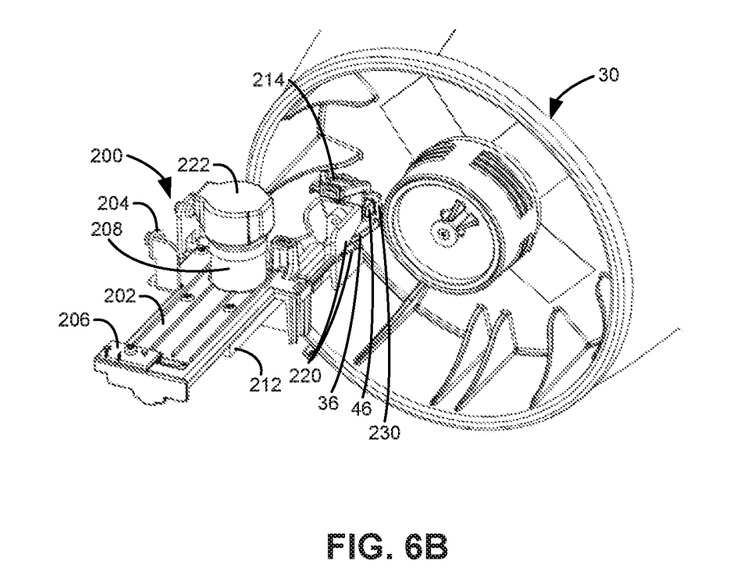

FIGS. 6A-6B illustrate one example of the operation of chip access device 200 previously described and illustrated with reference to FIGS. 5A-5C. FIG. 6A illustrates chip access device 200 with rail 212 in a first (i.e., retracted) position where data connector 214 is disengaged from the contacts of chip 44 of supply container 30. FIG. 6B illustrates chip access device 200 with rail 212 in a second (i.e., extended) position where data connector 214 is engaged with the contacts of chip 44 of supply container 30.

As illustrated in FIG. 6A, in the first position rail 212 is fully retracted and sensor 206 indicates that rail 212 is in the first position. In the first position, supply container 30 may be removed or replaced. Also in the first position, supply container 30 may be rotated to remove build material from the supply container or to add build material to the supply container. With supply container 30 in a stationary home position, motor 208 may be operated to move rail 212 to the second position as illustrated in FIG. 6B.

Once rail 212 moves out of the first position, sensor 206 indicates that rail 212 is not in the first position. Encoder 210 (FIG. 5C) indicates the position of rail 212 based on the rotation of motor 208. As rail 212 is moved toward supply container 30, first alignment component 220 (e.g., the V-shaped notch) of chip access device 200 engages first alignment component 36 (e.g., the fin) of supply container 30 to coarsely align data connector 214 with the contacts of chip 44. Also as rail 212 is moved toward supply container 30, the first portion 230 (e.g., the rectangular shaped through-hole) and the second portion 231 (e.g., the notch) of the second alignment component of chip access device 200 engages tab 46 and fin 49, respectively, of the second alignment component of supply container 30 to finely align data connector 214 with the contacts of chip 44 prior to data connector 214 contacting the contacts of chip 44. Once rail 212 is fully extended in the second position, data connector 214 engages the contacts of chip 44. With data connector 214 engaged with the contacts of chip 44, chip 44 may be accessed for read and/or write operations.

Figure 7:
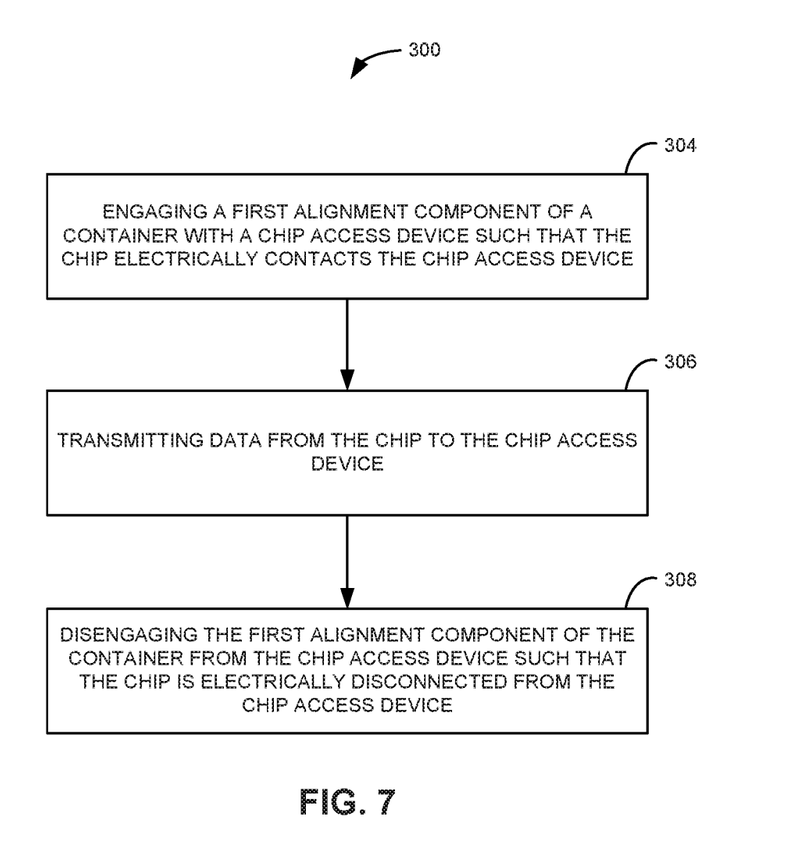
FIG. 7 is a flow diagram illustrating one example of a method for operating a printing system.

FIG. 7 is a flow diagram illustrating one example of a method 300 for operating a printing system, such as printing system 100 previously described and illustrated with reference to FIG. 4. At 304, method 300 includes engaging a first alignment component of a container with a chip access device such that the chip electrically contacts the chip access device. At 306, method 300 includes transmitting data from the chip to the chip access device. At 308, method 300 includes disengaging the first alignment component of the container from the chip access device such that the chip is electrically disconnected from the chip access device.

In one example, method 300 includes engaging a second alignment component of the container with the chip access device such that the chip electrically contacts the chip access device. In this example, method 300 also includes disengaging the second alignment component of the container from the chip access device such that the chip is electrically disconnected from the chip access device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A supply container comprising:
a housing comprising a cylindrical sidewall portion and an inner sidewall portion extending between the cylindrical sidewall portion;
a chip coupled to the inner sidewall portion;
a first alignment component comprising a first fin coupled to the cylindrical sidewall portion and the inner sidewall portion; and
a second alignment component comprising a second fin coupled to the cylindrical sidewall portion and the inner sidewall portion,
wherein the second fin is smaller than the first fin,
wherein the second alignment component comprises a tab coupled to the inner sidewall portion, and
wherein the chip is between the second fin and the tab.

2. The supply container of claim 1, wherein the tab comprises a base portion and a tapered portion extending from the base portion.

3. The supply container of claim 1, wherein the first fin comprises a first portion having a first width and a second portion having a second width less than the first width.

4. The supply container of claim 1, wherein the second fin is rectangular shaped.

* * * * *